Nov. 25, 1958
J. J. BOOTH
2,861,433
PRE-MIX BEVERAGE VENDING MACHINE
Filed Dec. 15, 1954
2 Sheets-Sheet 1
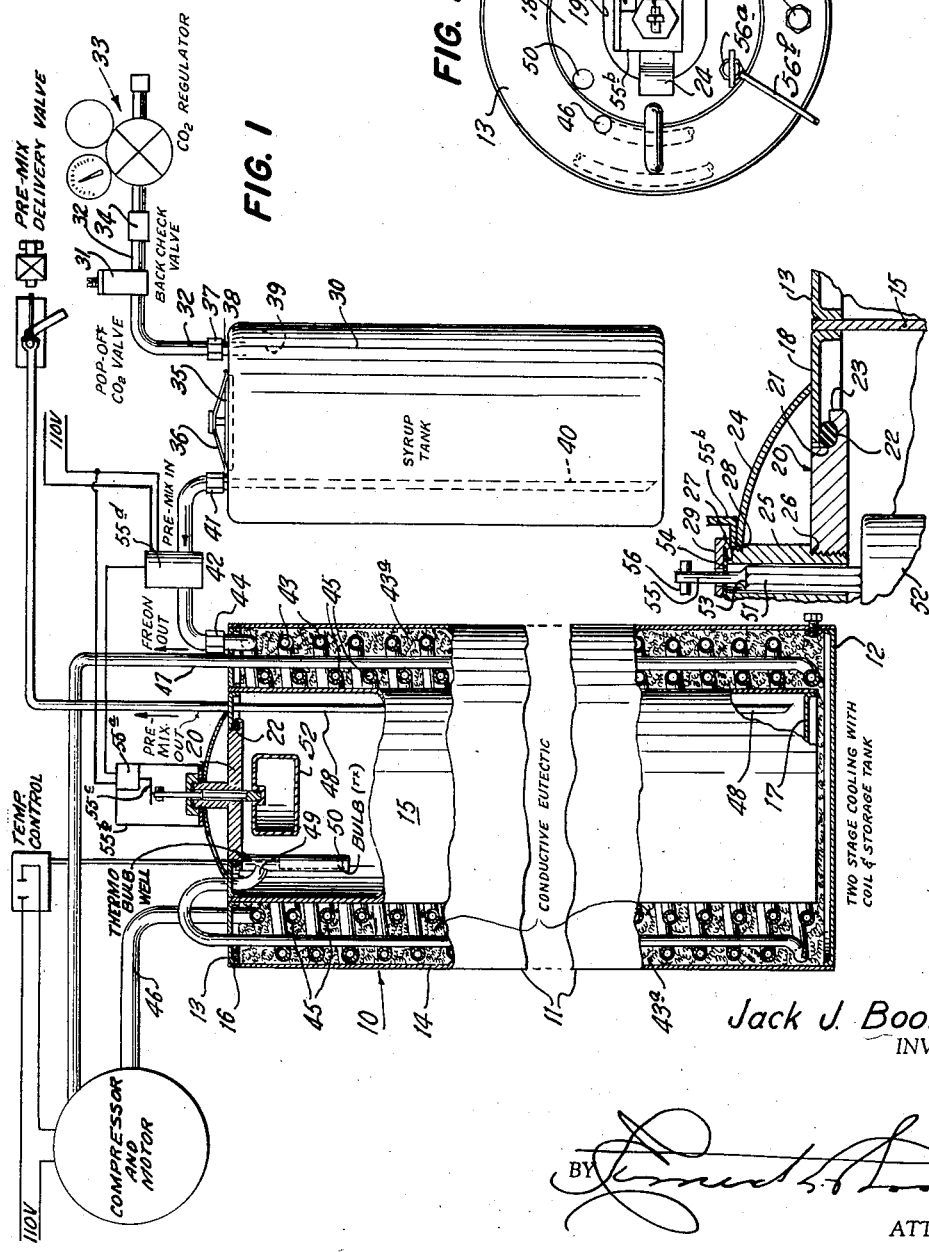
Jack J. Booth
INVENTOR
BY
ATTORNEY

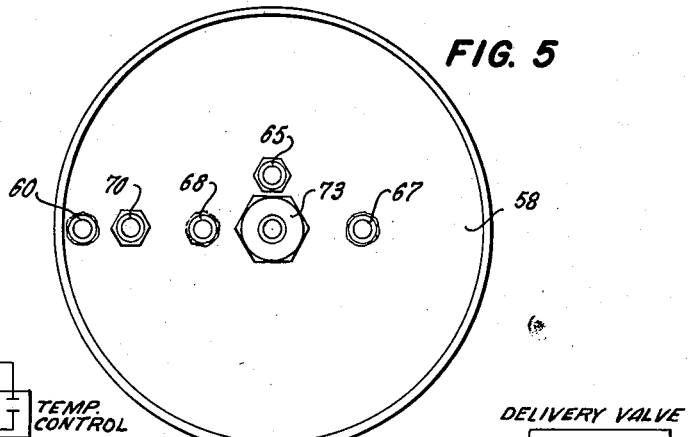
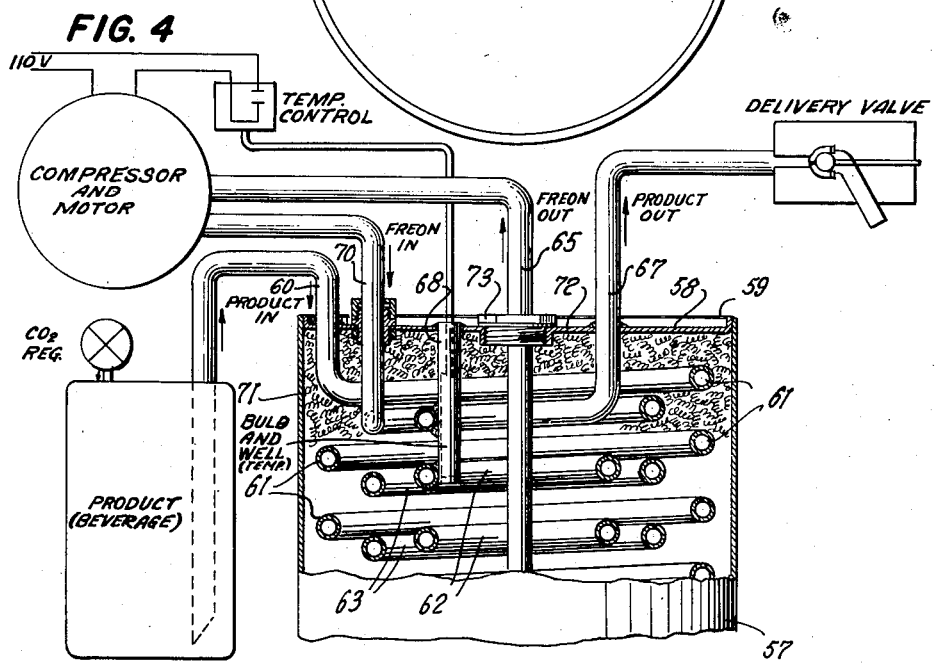
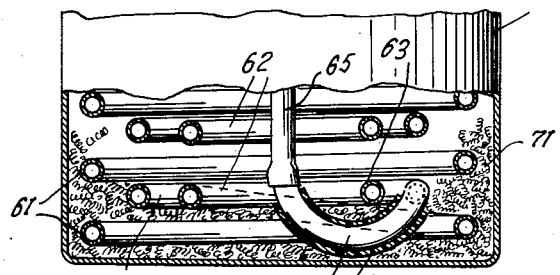

United States Patent Office 2,861,433
Patented Nov. 25, 1958

2,861,433

PRE-MIX BEVERAGE VENDING MACHINE

Jack J. Booth, Dallas, Tex.

Application December 15, 1954, Serial No. 475,393

12 Claims. (Cl. 62—188)

This invention relates to machines for vending beverages in cups and it has particular reference to such machines for vending pre-carbonated beverages.

Heretofore, those seeking to produce and operate a pre-mixed beverage vending machine have been confronted with many problems, the chief among which is the control of the intractable fluid during temperature changes and when drawn into a rapid succession of cups from storage through a heat exchanger, considerable ebullience or foaming is created as a result of the absence of any wholly effective provision for the maintenance of optimum temperature conditions within the vessel through which the beverage passes from the pre-mix storage tanks to a controlled outlet.

It is the principal object of the invention to provide an improved heat exchanger by which pre-mixed beverage is maintained at a proper temperature to preclude foaming irrespective of the rapidity at which cups are filled with the beverage.

Another object of the invention is to maintain a predetermined quantity of pre-cooled beverage within the heat exchanger at all times, keeping the beverage at a temperature above 27° F. through the medium of a conductive eutectic solution consisting of polyethylene glycol and water in proper proportions which goes through heat of fusion at temperatures between 27° F. and 36° F., which temperatures are variable depending on mixtures. Inasmuch as the solution per se is a poor conductor, taking on and giving up heat slowly, the invention anticipates the adding of curled metallic chips, preferably aluminum shavings or the equivalent to the eutectic solution, said chips or shavings being always in intimate contact to form voids which are filled with the solution to produce a high capacity eutectic storage as well as providing for rapid conduction, that is, it cools down fast when refrigerated and gives up temperature rapidly to product call.

Still another object of the invention is to provide two stage controlled cooling of beverage through the medium of the above described conductive eutectic solution stored in a tank through which parallel coils extend, one to carry the pre-mixed beverage and the other, Freon gas or an equivalent refrigerating agent. On the other hand, the invention anticipates an outer tank and an inner tank defining a space therebetween for the refrigerant and beverage coils completely surrounded by the eutectic solution and the metallic conductive medium, the inner tank providing a storage for the pre-cooled beverage from which it is drawn for delivery into cups in a more or less conventional manner.

Yet another object of the invention is to provide thermostatic means for controlling the compressor of the refrigerating apparatus according to temperature variations of the beverage as the latter enters the heat exchanger.

Other objects will appear as the description proceeds when considered with the annexed drawings, wherein:

Figure 1 is an elevational view of a heat exchanger constructed according to the invention, parts being broken away to illustrate the inner beverage storage tank and intermediate coils.

Figure 2 is a top plan view of a cover for the storage tank.

Figure 3 is a fragmentary detail view of the inner tank and cover showing an enlarged view of the seal therebetween.

Figure 4 is a modified form of heat exchanger parts of which are shown in vertical section, and Figure 5 is a top plan view thereof.

Continuing with a more detailed description of the drawing, reference is primarily made to Figures 1 and 2 showing one form of the invention and in which numeral 10 generally indicates the heat exchanger which is comprised of an outer tank 11 in which is welded a bottom 12. Within the top of the tank is disposed an annulus 13 which provides a closure for an annular space 14 created by the walls of the outer tank 11 and those of an inner tank 15. The annulus 13 has downwardly turned inner and outer flanges 16 which are welded to the upper edges of the inner and outer walls of the concentric tanks 11 and 15.

The inner tank 15 has a bottom 17 which is welded in position, as shown, and is further provided with a top 18 in which is formed an elliptical opening 19 (Figure 2). A closure 20 of like shape is provided with a peripheral recess 21 (Figure 3) which receives an O-ring 22. The closure 20 is inserted into the opening 19 by turning it to position its long axis at right angles with that of the opening. Once it is within the tank 15, the neoprene sealing ring 22 engages the undersurface of the closure 20 adjacent the edge of the opening 19 therein and upward movement of the closure will compress the ring tightly against the cover 18. A lip 23 formed along the outer edge of the closure and partly defining the recess 21 has a tendency to force the ring 22 inwardly toward the opposite or inner wall of the recess to insure against displacement of the ring from proper sealing position.

When the closure 20 is in place within the vessel, it need not be removed therefrom but only displaced when cleaning of the tank 15 becomes necessary. Serving to hold the closure in place and to form a bridge against which pressure is imposed to bring the closure upwardly into sealing relationship with the cover 18, an arcuate bar 24 spans the closure 20 and has its ends bearing against the cover 18 at diametrically opposed points. The midsection of the bar 24 is supported by a sleeve 25 whose lower end is threaded into a hole in the center of the closure 20 up to an annular shoulder 26 in the sleeve. The bar 24 is apertured to receive the upper threaded end 27 and rests upon an annular shoulder 28 of the sleeve. A cap 29 is threaded onto the upper end of the sleeve and bears against the midsection of the bar 24 to impose the necessary pressure to cause the closure 20 to be brought upwardly to engage the seal 22 firmly with the underside of the cover 18. The sleeve 25 serves also as the housing for a snifter valve which will be identified and described later.

The arrangement shown and described forms part of the elements of a pre-mix beverage vending machine employing a refrigerating apparatus in a manner similar to that shown in Patent No. 2,498,524, a cup dispenser such as shown in my co-pending application Serial Number 230,779 filed June 9, 1951, now Patent No. 2,747,782 and a timer similar to that disclosed in my co-pending application Serial Number 278,721 filed March 26, 1952, now Patent No. 2,772,812. The present invention involves the particular conductive medium recited in the foregoing and the manner in which the same is employed in the controlling of temperatures of pre-mixed beverages during their transfer from a pre-mix syrup drum to the heat exchanger and thence to the discharge valve of the vending machine.

Vending machines are usually distributed to various locations and are replenished with beverage conveyed in drums 30 from a beverage plant to the machine location in trucks. Due to changes in weather temperature and the agitation of the beverage drums en route, excessive $CO_2$ pressure is created in the tank 30 and to relieve this pressure so that constant volume flow of beverage from the drum to the heat exchanger may be accomplished, a pop-off valve 31 is arranged in the tubing 32 which extends between the drum 30 and a $CO_2$ gas regulator 33. Also, a back-check valve 34 is incorporated in the line 32 between the pop-off valve 31 and regulator 33.

The pre-mix drum 30 has a cover 35 which is of the same shape and is provided with substantially the same sealing means as the cover 18 of the tank 15 of the heat exchanger. Also, it is held in position by an arcuate bar 36 not unlike the bar 24 of the tank cover shown in Figure 2.

A quick disconnect 37 provides connection between the charging tube 32 and the inlet 38 of the drum, the inner end 39 of the inlet tube being turned outwardly towards the wall of the drum 30 so that agitation in filling will be reduced to the minimum.

Pre-mixed beverage is forced out of the drum 30 under $CO_2$ pressure through an outlet pipe 40 which extends to the bottom of the drum 30. A quick disconnect 41 provides connection between the upper end of the outlet pipe 40 and one end of a connecting tube 42 whose opposite end is joined to the pre-mix coil 43 in the heat exchanger by means of another coupling or quick disconnect 44. These couplings or so called quick disconnects are of conventional manufacture.

The pre-mix coil 43 is parallel with a refrigerant coil 45 through which Freon or other suitable refrigerant is caused to flow from and back to the refrigerating machine (not shown) by way of the inlet pipe 46 and outlet pipe 47. During its passage through the pre-mix coil 43, the beverage is lowered to a temperature of not less than substantially 27° F. where it remains, due to the fact that the composition of polyethylene glycol and water making up the eutectic solution goes through heat of fusion at temperatures between 27° F. and 36° F. Actually, the solution is comparable to a water ice bank except that it will not freeze hard and expand to cause damage as is common with ice.

Irregularly formed metallic chips or aluminum shavings 43a are deposited into the annular space 14 through an opening therein closed by the plug 43b (Figure 2). These shavings are capable of intimate contact, yet by virtue of their peculiar shape, unlike flakes or minute metallic particles, these chips or shavings such as may be in the form of lathe cuttings, leave voids or interstices which are occupied by the eutectic solution with which the said space 14 is filled to the top. The metallic chips are essential in that the eutectic solution is deficient in conduction and only by the addition of the metallic particles in close union will the eutectic solution actually become a conductive eutectic medium capable of performing the function required of it in the maintaining of controlled temperatures in a pre-mix vending apparatus. The conductive eutectic solution reacts quickly to the temperature needs of the product which, in this case, is the pre-mixed beverage as it is drawn slowly or rapidly from the tank 15 of the heat exchanger 10 by way of the tube 48 whose lower end extends almost to the bottom of the tank 15 and whose upper end is extended to a suitable discharge valve not shown herein but such as that illustrated in my co-pending application Serial Number 278,721, mentioned above.

When the pre-mixed beverage is circulated in the coil 43, it emerges therefrom through an inwardly turned end 49 of the coil into the tank 15. However, in its passage from the outlet end 49 of the coil the beverage impinges a thermostat bulb well 50 which is suspended from the annulus 13 of the heat exchanger and any changes in temperature of the beverage radical enough to require starting or stopping of the compressor of the refrigerating machine are reflected in a thermostat (not shown) whose bulb is disposed in the well 50 and, by suitable and conventional means, the compressor's action is controlled by the thermostat.

Referring again to the snifter valve mentioned previously, a valve for a similar purpose is shown in my Patent No. 2,498,524 mentioned above. However, the present snifter valve consists of a hexagonal stem 51 (Figures 1 and 3), on the lower end of which is suspended a float 52 within the tank 15. The stem extends upwardly through the bore of the sleeve 25. A shoulder 53 on the stem forms the valve which seats against the washer 54. Excess gas may escape between the stem 51 and the wall of the bore of the stem until the liquid rises to a point where the float 52 will become buoyant, whereupon the float will raise the stem to bring the valve 53 against its seat 54. Also, discharge of gas may be accomplished manually from the tank 15 by pressing downwardly on the extension 55 of the stem 51 which extends through a central opening in the cap 29. A handle 56 is provided on the extension 55 which also prevents downward displacement of the stem when the float is suspended. In the event inflow of liquid and gas into tank 15 should for any reason, exceed the outflow, automatic control thereof is accomplished by means of a micro-switch 55a, mounted on an L-shaped mounting plate 55b which latter is held in place by the cap 29, the pivoted contact arm 55c of the micro-switch extending laterally into the vertical path of the extension 55 of the stem 51. A solenoid valve 55d is incorporated in the pre-mix inflow tube 42 to which are connected wires from the current source and to the solenoid, in turn, are connected wires providing current to the switch 55a. As the float 52 rises in the tank 15, the extension 55 will contact the arm 55c of the micro-switch, closing the latter which will close the solenoid valve 55d against passage of liquid through tube 42 into the tank 15. As soon as the condition is corrected, float 52 will recede, causing the current to the solenoid valve 55d to be opened through switch 55c restoring flow of liquid through tube 42. While a $CO_2$ gas bleed-off valve 56a and liquid release tube 56b are provided on the cover 18 for manually releasing excess gas and liquid from the tank 15, the snifter valve will perform the same purpose automatically by stopping flow of liquid and gas through tube 42.

It will be observed that the mounting plate 55b is so disposed on the top of the tank 15 that the switch arm 55c will always lie in the vertical path of the float stem extension irrespective of the position of the mounting plate relative to said extension.

In Figures 4 and 5 is shown a modified form of the invention. The form just described embodies a two-stage cooling system by virtue of the coils and storage tank. The modified form of the invention is likewise referred to as a two-stage cooling system because of a double coil through which the beverage is passed counter to a single coil carrying the refrigerant located between the inner and outer convolutions of the beverage coil which is continuous.

Reference numeral 57 denotes the tank of the modification and 58 the top which has an annular flange 59 welded to the top edge of the tank 57. The pre-mixed beverage enters the inlet 60 of a double coil consisting of a group 61 of outer convolutions and a group 62 of inner convolutions. The coil is continuous and the inner and outer convolutions thereof occupy positions on each side of a refrigerant coil 63. The refrigerant coil 63 terminates at the bottom of the tank 57 and to the terminal end of the coil is connected an end of a tube 64. The opposite end of the tube 64 enters the swaged end of a vertical pipe 65 and a polyethylene jacket 66 embraces the tube 64 to insulate the refrigerant coil from the beverage coil 61. The purpose of the tube 64 is to facilitate installation of the refrigerant coil which is first established between the two sets of convolutions 61—62 of the pre-mix coil and is subsequently connected at its lower end to the outlet tube 65.

Pre-mixed beverage emerges from the inner group of convolutions 62 through the outlet 67 after entering at 60. A thermostatic bulb well 68 is welded to the upper convolutions of the inner group 62 so that the compressor of the refrigerating machine, not shown, may be started and stopped through suitable electrical connection between the same and the thermostat whose bulb is disposed in the well 68, when changes in the temperature of the beverage passing through the beverage coil requires. This arrangement is similar to that previously described and as shown in Figures 1 to 3.

The refrigerant enters the coil 63 through the inlet 70 and emerges through the outlet pipe 65 for recirculation in the refrigerating system.

The tank 57 is filled to capacity with shavings or irregular chips 71 of aluminum or other metallic particles suitable for the purpose so that there will be voids or interstices between the particles. These voids or interstices are filled with eutectic solution which, when combined with the metallic particles in close union, provides a unique medium for maintaining the temperature of the beverage flowing through the coil 61—62 at a temperature above freezing, due as previously stated, to the ideal characteristics of the aluminum cuttings to conduct heat rapidly, combined with the high fusion rate of polyethylene glycol composition constituting the eutectic solution which, of course, varies according to mixture. The eutectic solution and aluminum or other metallic shavings or particles are deposited into the tank 57 through an opening 72, provided therefor in the top of the tank and closed by a plug 73.

Manifestly, the construction as shown and described is capable of some modification and such modification as may be construed to fall within the scope and meaning of the appended claims is also considered to be within the spirit and intent of the invention.

What is claimed is:

1. In a heat exchanger for pre-carbonated beverage vending machines, a tank having closed top and bottom, a beverage coil of tubing disposed in said tank having its inlet and outlet ends extending from the top of said tank, means for introducing beverage into said inlet end under $CO_2$ pressure, valve means for discharging said beverage at said outlet end, a refrigerant coil in said tank in concentric parallelism with said beverage coil, means for circulating a refrigerant through said refrigerant coil, a eutectic solution surrounding said coils from the bottom to the top of said tank, metallic particles of irregular shape in intimate contact in said solution forming voids to be filled by said solution to accelerate heat transference of said solution between said coils and thermostatic means for regulating the temperature of said beverage.

2. In combination with a refrigerating apparatus, a carbonated beverage cooler comprising a cylindrical tank having closed ends, a pair of helical coils disposed concentrically in the tank in heat exchange relationship, means for forcing beverage through one of the coils, means for circulating a refrigerant through the other coil, a heat conducting medium filling the tank about the coils, the heat conducting medium comprising a eutectic solution and a conduction accelerator consisting of aluminum cuttings of irregular shape and size in contiguous relationship.

3. In combination with a refrigerating apparatus, a carbonated beverage cooler comprising a cylindrical outer tank having closed ends, an inner tank disposed concentrically in the outer tank, a pair of helical coils disposed concentrically between the tanks, means for forcing beverage through one of the coils and into the inner tank, means for circulating a refrigerant through the other coil, a heat conducting medium between the coils and the tanks, the heat conducting medium comprising a eutectic solution and a conduction accelerator consisting of metallic particles of irregular sizes and shapes, and an electrically actuated float controlled means associated with the inner tank for interrupting flow of beverage through the beverage coil and into the inner tank when the beverage in the inner tank rises above a predetermined level.

4. The structure of claim 3, the electrically actuated float controlled means comprising a float, a switch opened and closed by vertical displacement of the float, and a solenoid actuated upon opening and closing the switch.

5. The structure of claim 2, and a second tank disposed concentrically within the cylindrical tank and connected to the outlet of the beverage coil whereby beverage from the beverage coil is discharged into the second tank for storage at temperatures controlled by the heat conducting medium, and means for drawing off beverage from the second tank under pressure, the coils being spaced radially from the tanks and from one another.

6. The structure of claim 3, and means for bleeding carbon dioxide from the second tank.

7. The structure of claim 3, and a thermostat having a bulb confined within the second tank, in the path of beverage discharged into the tank from the beverage coil, and means acted on by the thermostat for controlling the temperature of the beverage.

8. In a heat exchanger for beverage vending machines, a tank, a beverage coil of tubing disposed in said tank, means for circulating a beverage through said beverage coil, a refrigerant coil of tubing disposed in said tank, means for circulating a refrigerant through said refrigerant coil, said coils being spaced from one another, a eutectic solution surrounding said coils, and metallic particles of irregular shape in said tank and between said coils to accelerate heat transferred between said coils.

9. In a heat exchanger for beverage vending machines, a tank, a helical beverage coil and a helical refrigerant coil disposed concentrically in the tank, means for circulating beverage through the beverage coil, means for circulating a refrigerant through the refrigerant coil, the coils being spaced radially from one another, a eutectic solution surrounding the coils, and metallic particles of irregular shape in the tank and between the coils to accelerate heat transfer between the coils, the beverage coil comprising an outer group of concentric convolutions disposed radially outwardly of the refrigerant coil and an inner group of concentric convolutions disposed radially inwardly of the refrigerant coil, the arrangement being such that beverage flows first through the outer group of convolutions and then through the inner group of convolutions.

10. In a heat exchanger for beverage vending machines, a cylindrical tank, a helical beverage coil and a helical refrigerant coil disposed concentrically in the tank, means for circulating a beverage through the beverage coil, means for circulating a refrigerant through the refrigerant coil, the coils being spaced radially from one another, a eutectic solution surrounding the coils, and metallic particles of irregular shape in the tank and between the coils to accelerate heat transfer between the coils, an inner tank disposed concentrically in the first mentioned tank, the coils being disposed concentrically between the tanks and spaced radially therefrom, the beverage coil having an outlet end connecting with the inner tank whereby beverage circulated through the beverage coil is discharged into the inner tank.

11. In a heat exchanger for beverage vending machines, a cylindrical tank, a helical beverage coil and a helical refrigerant coil disposed concentrically in the tank, means for circulating a beverage through the beverage coil, means for circulating a refrigerant through the refrigerant coil, the coils being spaced radially from one another, a eutectic solution surrounding the coils, and metallic particles of irregular shape in the tank and between the coils to accelerate heat transfer between the coils, an inner tank disposed concentrically in the first mentioned tank, the coils being disposed concentrically between the tanks and spaced radially therefrom, the beverage coil having an outlet end connecting with the inner tank whereby beverage circulated through the beverage coil is discharged into the inner tank, the beverage coil being disposed radially outwardly of the refrigerant coil.

12. In a heat exchanger for beverage vending machines, a cylindrical tank, a helical beverage coil and a helical refrigerant coil disposed concentrically in the tank, means for circulating a beverage through the beverage coil, means for circulating a refrigerant through the refrigerant coil, the coils being spaced radially from one another, a eutectic solution surrounding the coils, and metallic particles of irregular shape in the tank and between the coils to accelerate heat transfer between the coils, the eutectic solution comprising polyethylene glycol and water.

References Cited in the file of this patent

UNITED STATES PATENTS

| | | |
|---|---|---|
| 2,108,898 | Lyons | Feb. 22, 1938 |
| 2,486,822 | Cameron | Nov. 1, 1949 |
| 2,496,466 | Graham | Feb. 7, 1950 |
| 2,506,840 | Pique | May 9, 1950 |
| 2,665,559 | Dexter | Jan. 12, 1954 |

FOREIGN PATENTS

| | | |
|---|---|---|
| 569,390 | Great Britain | May 22, 1945 |